(12) United States Patent
Mino

(10) Patent No.: US 8,358,902 B2
(45) Date of Patent: Jan. 22, 2013

(54) APPARATUS, METHOD AND PROGRAM FOR IMAGE SEARCH

(75) Inventor: Kazuhiro Mino, Kanagawa-ken (JP)

(73) Assignee: Fujifilm Corporation (JP)

( * ) Notice: Subject to any disclaimer, the term of this patent is extended or adjusted under 35 U.S.C. 154(b) by 1218 days.

(21) Appl. No.: 11/540,555

(22) Filed: Oct. 2, 2006

(65) Prior Publication Data

US 2007/0077025 A1    Apr. 5, 2007

(30) Foreign Application Priority Data

Sep. 30, 2005  (JP) ................................ 2005-286779
Sep. 21, 2006  (JP) ................................ 2006-255163

(51) Int. Cl.
*H04N 5/765*    (2006.01)
*H04N 5/931*    (2006.01)

(52) U.S. Cl. ........................................ 386/200; 386/204

(58) Field of Classification Search ........................ None
See application file for complete search history.

(56) References Cited

U.S. PATENT DOCUMENTS

| | | | | |
|---|---|---|---|---|
| 5,579,471 A | * | 11/1996 | Barber et al. ................. | 715/700 |
| 6,012,069 A | * | 1/2000 | Shibazaki ............................. | 1/1 |
| 6,999,636 B1 | | 2/2006 | Enokida et al. | |
| 2005/0008225 A1 | * | 1/2005 | Yanagisawa et al. ......... | 382/190 |

FOREIGN PATENT DOCUMENTS

| | | |
|---|---|---|
| JP | H8-249351 A | 9/1996 |
| JP | 10-340272 A | 12/1998 |
| JP | 2001-134765 A | 5/2001 |
| JP | 2002-108913 A | 4/2002 |
| JP | 2005-049968 A | 2/2005 |
| JP | 2005-63465 A | 3/2005 |

OTHER PUBLICATIONS

Japanese Office Action "Notification of Grounds for Rejection" issued Aug. 23, 2011; Japanese Patent Application No. 2006-255163 with translation.

Japanese Office Action "Decision of Rejection" dated Jan. 10, 2012; Japanese Patent Application No. 2006-255163 with a partial translation.

* cited by examiner

*Primary Examiner* — William C Vaughn, Jr.
*Assistant Examiner* — Oluwaseun A Adegeye
(74) *Attorney, Agent, or Firm* — Studebaker & Brackett PC; Donald R. Studebaker

(57) ABSTRACT

One or more representative images extracted from an image group comprising a plurality of images is/are displayed. A part or all of the representative image or images, such as a main subject region or a background region including a search target, is/are selected from the representative image or images, and used for setting search conditions. The image group is searched for an image or images agreeing with the search conditions having been set.

9 Claims, 9 Drawing Sheets

APPARATUS, METHOD AND PROGRAM FOR IMAGE SEARCH

BACKGROUND OF THE INVENTION

1. Field of the Invention

The present invention relates to an image search apparatus and an image search method for searching a plurality of images for an image by using representative images extracted from the plurality of images. The present invention also relates to a program that causes a computer to execute the image search method.

2. Description of the Related Art

Since digital cameras do not need film unlike film cameras, digital cameras have reduced the cost of photography itself. As a result, more images tend to be photographed by digital cameras. Increase in storage capacity of recording media to be inserted therein also contributes to this trend. Consequently, large numbers of images are stored in recording media for digital cameras and in recording media such as hard discs of personal computers or CD-Rs in which image data read from the recording media for digital cameras are stored. Some of the images are unnecessary images although the others are necessary. In addition, the images are left unorganized in many cases. The necessary images refer to good-looking images while the unnecessary images refer to images photographed unsuccessfully or images photographed twice or more, for example.

Classifying such a large amount of images is a troublesome task. Therefore, an apparatus has been proposed for supporting a search of a stock of images to extract a necessary image, extraction and deletion of an unnecessary image from the stock, and classifying and organizing the images based on events, dates, and locations, for example.

U.S. Pat. No. 6,999,636 describes the steps of calculating a characteristic quantity of a search key image illustrated by a user to look similar to a desired image, searching for a similar image based on the characteristic quantity, and displaying the similar image found through the search, as a manner of supporting an image search.

Furthermore, Japanese Unexamined Patent Publication No. 2002-108913 describes the steps of defining a plurality of image parts, preparing variations for the respective image parts, constructing an image to be registered with a database by selecting one of variations for each of the image parts, and setting an image search condition at the time of an image search by selection from the image parts.

Meanwhile, in the case where a user searches a large amount of stored images for a desired image, the user sets a search condition based on incomplete memories of the image.

Considering this fact that users carry out searches based on fragmentary memories, it is substantially difficult for users to illustrate entire images to search for, as has been described in U.S. Pat. No. 6,999,636. In addition, since skills of illustration vary from person to person, a considerable number of users do not think illustrating is a good interface.

In the case where a search condition is set according to selection from prepared parts as has been described in Japanese Unexamined Patent Publication No. 2002-108913, the parts may not fit well to remembered parts in actual images.

SUMMARY OF THE INVENTION

The present invention has been conceived based on consideration of the above circumstances. An object of the present invention is therefore to provide an image search apparatus and the like that enable an image search more accurately and easily based on fragmentary memories of an image remembered by a user.

An image search apparatus of the present invention comprises:

display means for displaying one or more representative images extracted from an image group comprising a plurality of images;

search condition setting means for setting search conditions by using a part or all of the representative image or images selected therefrom; and search means for searching the image group for an image agreeing with the search conditions having been set.

The search condition setting means may also set a position in the part of the representative image or images as one of the search conditions.

The image search apparatus of the present invention may further comprise region extraction means for extracting a main subject region and/or a background region from the representative image or images as a candidate or candidates for selection of the part or all of the representative image or images and for causing the extracted region or regions to become selectable.

The search condition setting means may have a function for carrying out image processing on the part or all of the representative image or images having been selected. In this case, the search condition setting means sets the search conditions by using the part or all of the representative image or images having been subjected to the image processing.

Furthermore, the search condition setting means may add search priority as one of the search conditions to the part or all of the representative image or images having been selected.

An image search method of the present invention comprises the steps of:

displaying one or more representative images extracted from an image group comprising a plurality of images;

setting search conditions by using a part or all of the representative image or images selected therefrom; and searching the image group for an image agreeing with the search conditions having been set.

The representative image or images refer(s) to an image or images that best represent(s) the type of an event or a main subject. For example, the representative image or images may be an image having been judged to be in the best quality, an image having been judged to have the best quality in a group classified according to distribution of a characteristic quantity, an image having the highest result of scene judgment, an image of the scene having the highest frequency, an average image according to the scene judgment, an image closest to the average image, an image at the center of distribution of a characteristic quantity in a group classified according to the distribution, and an image closest to the center, for example. The representative image or images can also be an image wherein a specific person is shown in the largest size, an image wherein a specific person is shown in the smallest size, and an image wherein the face of a person is shown in the smallest size enabling easier identification of a location represented by a background, for example.

The part of the representative image or images refers to a region of a main subject or a background such as a person, a human face, clothes, an animal, a plant, a still object, a vehicle, a building, and a mountain. The part of the image or images may have been extracted. Alternatively, a user may manually extract a region including a boundary of the part. Furthermore, the user may manually select a region so that the selected region can be extracted as the part. In addition, the user may manually select an outline region including a main subject or a background so that a region of the main subject or the background can be extracted from the selected region.

The image search method of the present invention may be provided as a program that causes a computer to execute the method.

According to the image search apparatus and the image search method of the present invention, the search conditions are set by using the part or all of the representative image or images selected from the representative image or images extracted from the image group. In the case where an image is searched for based on fragmentary memories thereof, the fragmentary memories are of something that exists in the image group to be searched and probably appears frequently in the image group. Furthermore, the fragmentary memories are highly likely composed of a combination of real image parts in the image group. Therefore, general image parts may not fit well to actual image parts that the user remembers, and a search using such general parts is inefficient. On the other hand, in the present invention, the part or all of the representative image or images can be used as an image part for the search, and the search can be carried out more easily with higher accuracy based on the fragmentary memories of the image remembered by the user.

In the case where the position in the part of the image or images is used as one of the search conditions, a position of a main subject or the like, that is, a memory on composition of the image, can be used as the search condition. Therefore, the image search can be carried out based on the more detailed conditions.

Furthermore, if the region extraction means also comprises the image search apparatus that extracts the main subject region and/or the background region from the representative image or images as the candidate or candidates for selecting the part or all of the image or images and causes the extracted region or regions to become selectable, the user simply has to carry out selection from the region or regions having been extracted. Therefore, the search conditions can be set by use of a user interface that is easier to operate. This is especially effective in the case where the present invention is applied to a terminal or the like installed in a store for general consumers.

In the case where the search condition setting means has the function for carrying out image processing on the part or all of the representative image or images having been selected and sets the search conditions by using the part or all of the representative image or images having been subjected to the image processing, the search conditions can reflect an intention of the search more clearly.

Alternatively, in the case where the search condition setting means adds the search priority as one of the search conditions to the part or all of the representative image or images having been selected, a search prioritizing only a specific person can be carried out. Therefore, a degree of clearness of memory can be reflected in the search.

DESCRIPTION OF THE PREFERRED EMBODIMENTS

Figure 1:
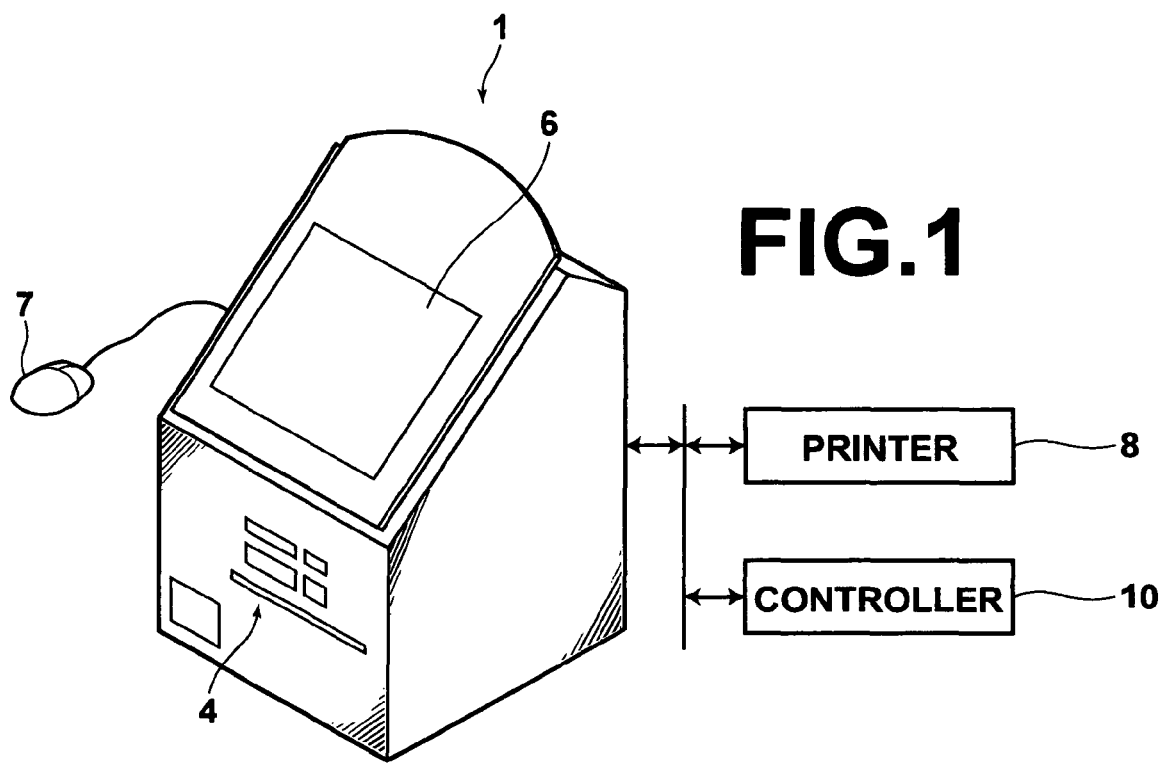
FIG. 1 is an external oblique view of an image search apparatus of a first embodiment of the present invention.
Figure 2:
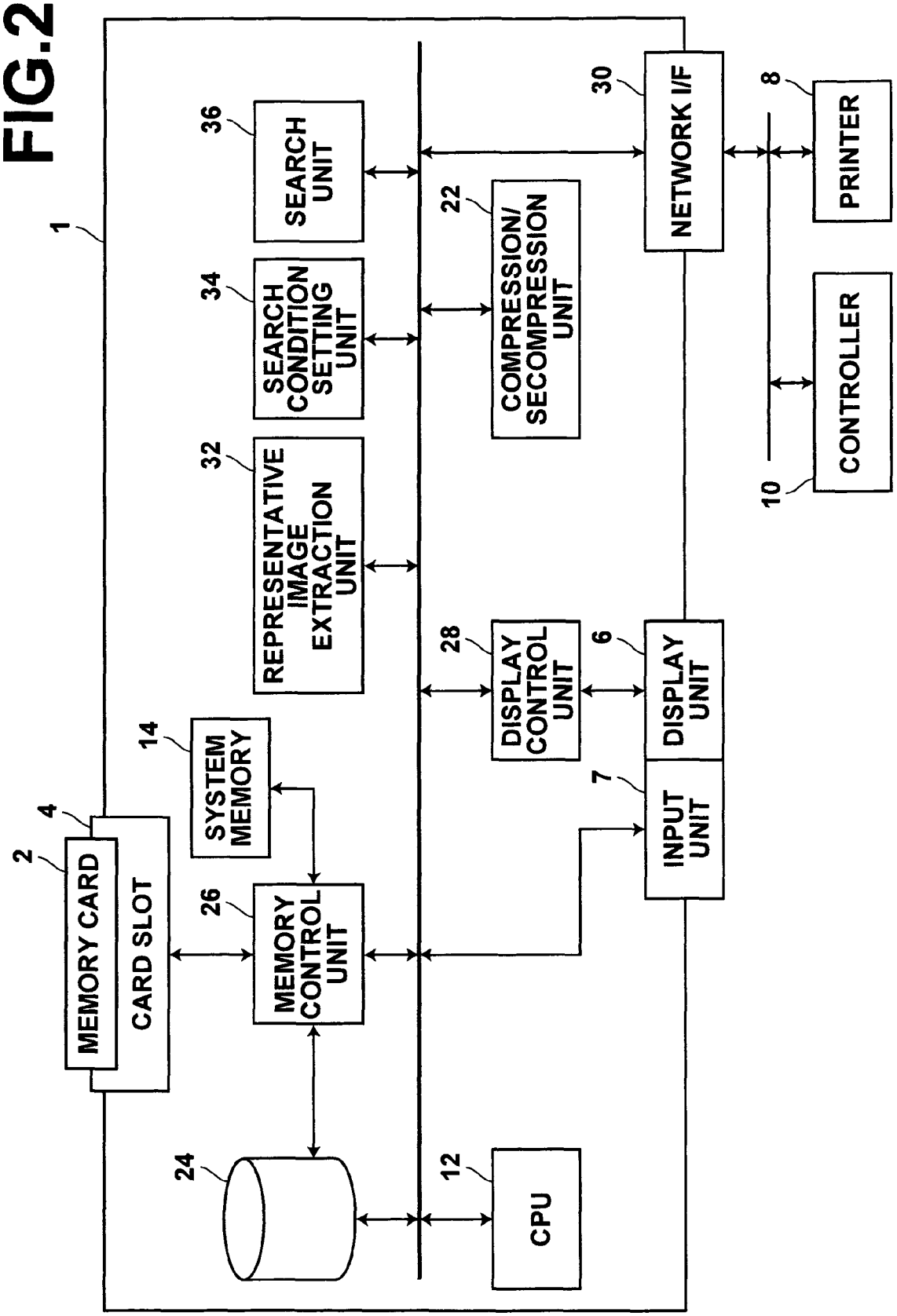
FIG. 2 is a block diagram showing the configuration of the image search apparatus in the first embodiment.

Hereinafter, embodiments of the present invention are described with reference to the accompanying drawings. FIG. 1 is an external oblique view of an image search apparatus of a first embodiment of the present invention while FIG. 2 is a block diagram showing the configuration of the image search apparatus. As shown in FIG. 1, an image search apparatus 1 in this embodiment is installed in a store such as a DPE store for enabling users to carry out image searches and to place print orders. The image search apparatus 1 comprises various kinds of card slots 4, a display unit 6, and an input unit 7. The card slots 4 are used for inserting therein various types of memory cards 2 that store images used at the time of print order placement, for reading the images from the memory cards 2, and for recording images in the memory cards 2. The display unit 6 comprises a liquid crystal monitor or the like used for various kinds of display for image searches and print orders. The input unit 7 comprises a mouse for inputting various kinds of instructions to the image search apparatus 1. The image search apparatus 1 is connected to a printer 8 installed in the DPE store and to a controller 10 comprising a computer that can carry out image processing and print order management.

As shown in FIG. 2, the image search apparatus 1 comprises a CPU 12 and a system memory 14, in addition to the display unit 6 and the input unit 7 described above. The CPU 12 carries out various kinds of control such as recording control and display control regarding image data representing images, and controls each of the components comprising the image search apparatus 1. The system memory 14 comprises a ROM that stores a basic program for operating the image search apparatus 1 and various kinds of constants, and a RAM used as workspace for the CPU 12.

The image search apparatus 1 also comprises a compression/decompression unit 22, a hard disc 24, a memory control unit 26, a display control unit 28 (display means), and a network interface 30, in addition to the card slots 4. The compression/decompression unit 22 compresses image data according to a format such as JPEG, and decompresses compressed image data. The hard disc 24 stores image data read from the memory cards 2 and various kinds of programs executed by the CPU 12 such as a program for representative image extraction and image search. The memory control unit 26 controls the system memory 14, the card slots 4, and the hard disc 24. The display control unit 28 controls display on the display unit 6. The network interface 30 is used for connecting the printer 8 and the controller 10 to the image search apparatus 1.

The card slots 4 correspond to the various types of the memory cards 2. However, only one card slot is shown as the card slot 4 in FIG. 2.

The image search apparatus 1 further comprises a representative image extraction unit 32 for extracting one or more representative images as will be described later, a search condition setting unit 34 (search condition setting means) for setting image search conditions, and a search unit 36 (search means) for carrying out an image search according to the conditions having been set.

Hereinafter, functions of the representative image extraction unit 32, the search condition setting unit 34, and the search unit 36 are described together with procedures carried out in this embodiment.

Figure 3:
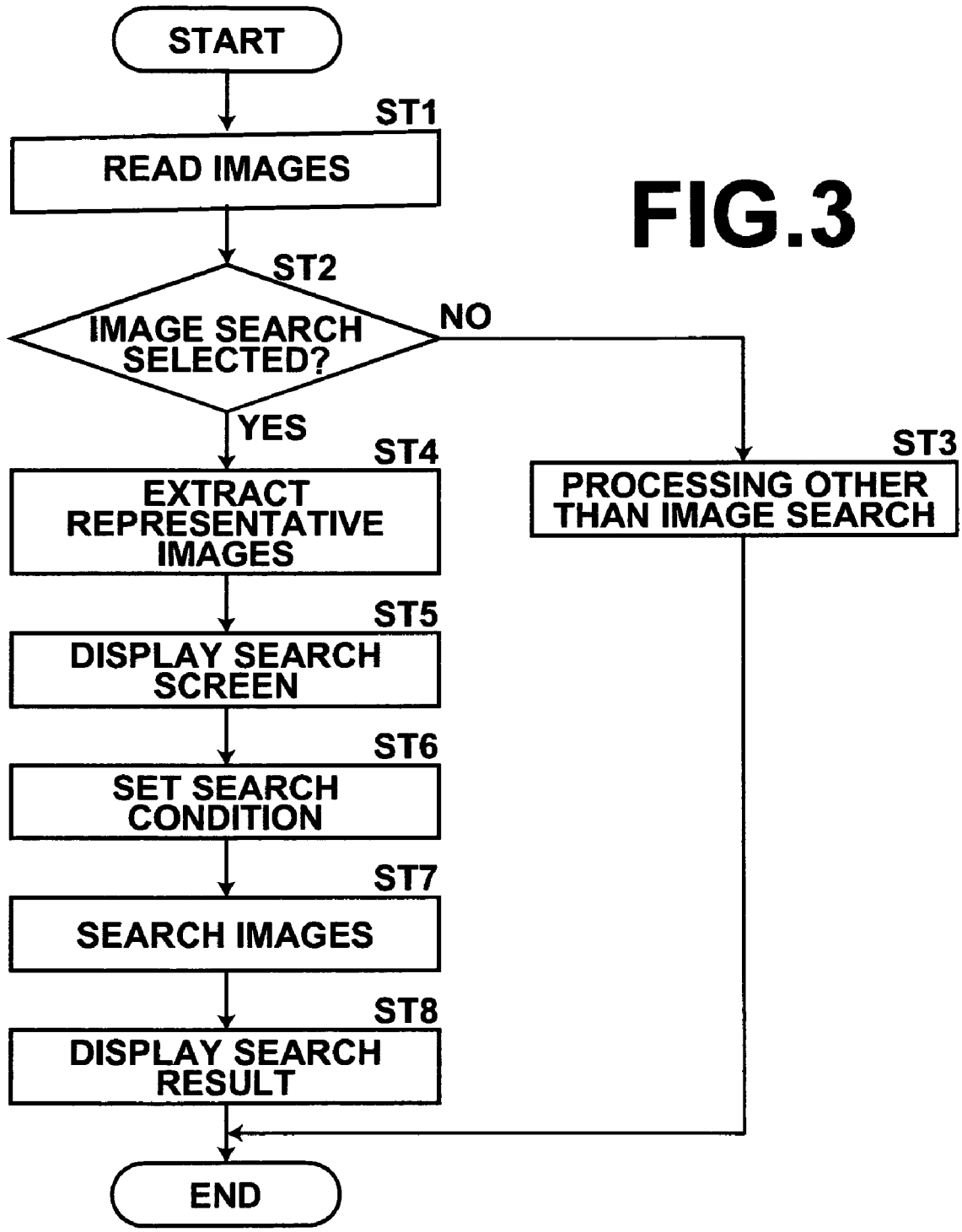
FIG. 3 is a flow chart showing procedures carried out in the first embodiment.

FIG. 3 is a flow chart showing the procedures of image search carried out in this embodiment. The memory card 2 brought by a user stores image data of a plurality of images comprising an image group. When the user inserts the memory card 2 in the corresponding one of the card slots 4, the image search apparatus 1 reads the image data of the image group stored in the memory card 2 (Step ST1), and temporarily stores the image data in the RAM of the system memory 14 or in the hard disc 24.

According to processing by the CPU 12, the image search apparatus 1 displays a menu screen on the display unit 6 for enabling the user to carry out selection from various kinds of services such as image search and image printing, and let the user select a desired one of the services (Step ST2). In the case where the user has selected any one of the services other than the image search service, the image search apparatus 1 carries out the selected service (Step ST3). In the case where the user has selected the image search service, the representative image extraction unit 32 automatically extracts one or more representative images from the images having been read (Step ST4).

The representative image or images refer(s) to an image or images that best represent(s) the type of an event or a main subject. As a method of extraction of the representative image or images, any known method can be adopted. For example, similar scenes comprising main subjects such as people and backgrounds are firstly grouped together according to a characteristic vector representing a color, a shape, a size, and the like, as has been described in Japanese Unexamined Patent Publications No. 2003-330941 and 2005-049968. Image quality of each of the images in each of the image groups is judged based on information on edges and density therein, and the image having the best quality is selected as the representative image for the corresponding group.

Figure 4:
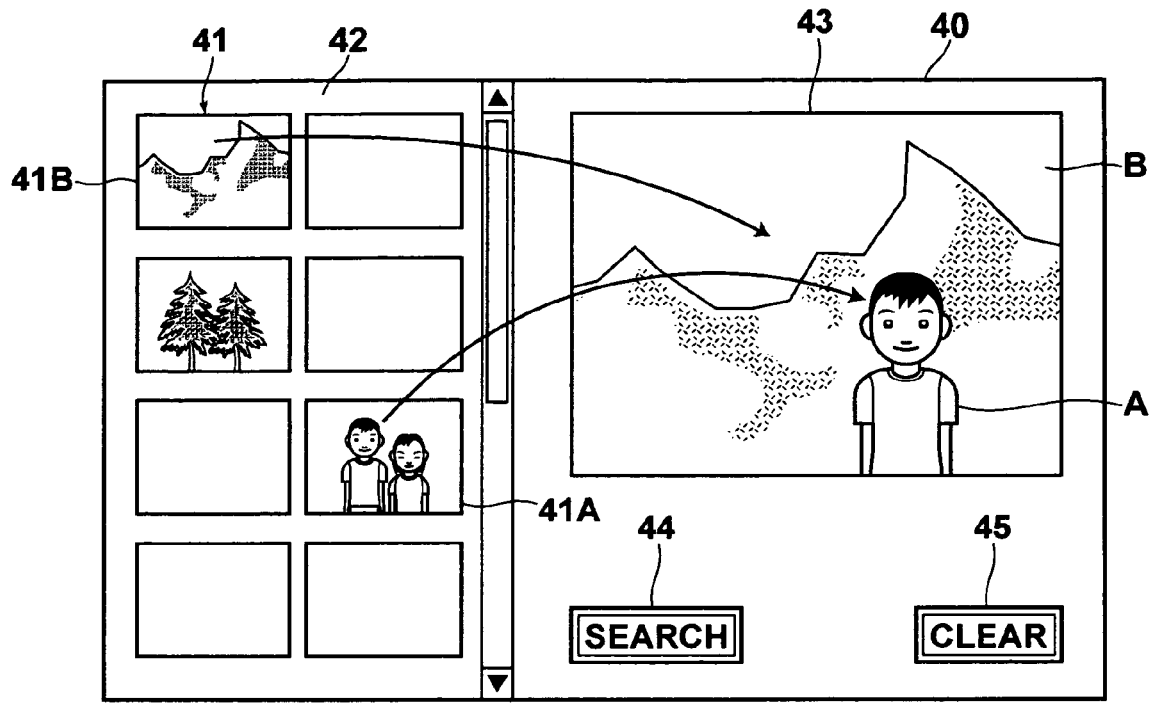
FIG. 4 shows an example of a search screen.

The display control unit 28 displays a search screen on the display unit 6 (Step ST5) after extraction of the representative image or images. FIG. 4 shows an example of the search screen. As shown in FIG. 4, a search screen 40 has a representative image area 42 where a catalog of representative images 41 is displayed, an input area 43 for display of an image used for a search, a "Search" button 44 for carrying out the search, and a "Clear" button 45 for clearing input data. In FIG. 4, the representative images are collectively shown by the reference code 41, and two of the representative images are referred to as images 41A and 41B.

The user selects the representative image including a search target from the representative images 41 displayed as the catalog, and selects a part or all of the selected representative image as a region representing the search target. The user pastes the selected region in the input area 43 to generate the image used for the search (hereinafter referred to as the search image), and the search condition setting unit 34 sets the search image as the search conditions (Step ST6). In other words, a part or all of the selected representative image is used as an image part for the search (hereinafter referred to as the search image part). The search image is generated in the following manner, for example.

In the case where the search target is a main subject such as a person, an animal, and a building, the user selects the region by a drag operation of the input unit 7 to include the search target in the representative image. The user then selects "Select as Main Subject" from a menu displayed by right clicking, and pastes the selected region in the input area 43 by a drag-and-drop operation. At this time, the user can paste the region by specifying a position of the region in the search image. The user can also adjust a size of the selected region in the search image.

After selection of "Select as Main Subject", it is preferable for a region of the main subject to be detected along an outline thereof in the region selected by the drag operation, according to a known method such as edge detection. Only the region of the detected main subject is then pasted in the input area 43. Alternatively, the user may manually extract the main subject along the outline thereof, by use of the input unit 7. Furthermore, the image search apparatus 1 may automatically extract the region by using an edge detection method or the like after the user clicks on the main subject. The user may select not only the entire person but also a part thereof, such as the face or clothes.

In the case where the search target is a background, the user selects a region of the background as the search target by clicking on or dragging the region in the representative image including the target, and selects "Select as Background" from the menu displayed in response to right click. The user selects a region in the input area 43 to be used for the background by a drag operation, and selects "Paste the Selected Background" by right click. In this manner, the selected background is pasted in the selected region in the input area 43. For the background, the user can also specify a position and a size thereof in the search image. In the case where the entire representative image is the search target, the entire representative image is selected by a click or a drag operation, and the user selects "Select as Background" from the menu displayed after right click. The user then selects the entire input area 43, and pastes the selected image therein.

The search target can be used as either a main subject or a background if the target is a tree or a mountain, for example. In such a case, the target can be selected as either a main subject or a background. However, the image search apparatus 1 is set to paste a search target selected as a background at the rear of a main subject. Therefore, it is preferable for the user to appropriately use either a main subject or a background. The user can cancel the search target by clicking the "Clear" button 45 if the target is unnecessary, even after the target has been pasted in the input area 43.

Not only a region but also a plurality of regions may be used as the search image part or parts. In addition, the search conditions can be set as a combination of a plurality of main subjects, a combination of backgrounds, and a combination of a main subject and a background, for example. FIG. 4 shows an example of the search image wherein the person on the left of the representative image 41A has been selected as a main subject A positioned on the right and a background of the representative image 41B has been selected as a background B in the input area 43. Since the search image can be generated by using a part or all of the representative image or images as the search image part or parts positioned at the desired position or positions in the desired size or sizes, fragmentary memories of the user can be faithfully and easily visualized.

When the user clicks the "Search" button 44 after the search image has been generated, the search unit 36 searches the image group read from the memory card 2 for the image or images agreeing with the search condition (Step ST7). In the case where the search image includes a main subject, the search unit 36 searches the image group for the image or images including the main subject. For example, in the case where a main subject is a person, the search unit 36 uses a known method such as matching of a characteristic quantity regarding face outline and facial parts including eyes, nose, mouth, and ears. At this time, a position of the main subject having been found is judged, and the image or images showing better agreement with the position of the main subject in the search image is/are searched for.

In the case where the search image includes a background, the search unit 36 compares a color of the background with a color of a background of each of the images read from the memory card 2, and finds the image or images showing better agreement. In the case where a background region of the search image is divided into regions, that is, in the case where the background region comprises a plurality of pasted backgrounds, the color comparison is carried out for each of the divided regions.

In the case where the search image includes both a main subject and a background, the search unit 36 carries out the search for the main subject followed by the search for the background in the same manner as has been described above.

Figure 5:
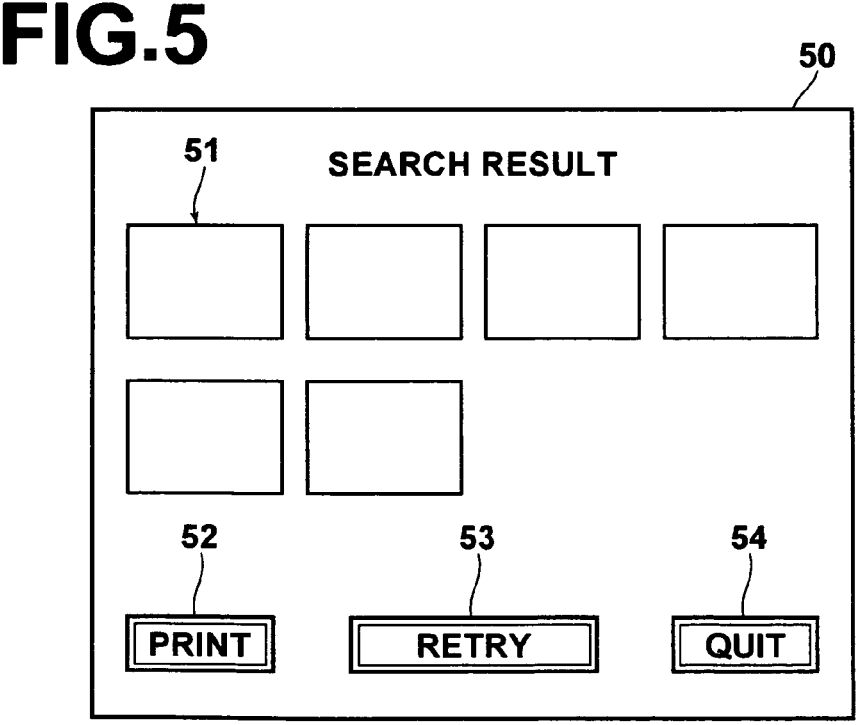
FIG. 5 shows an example of a search result screen.

After the search has been completed, the display control unit 28 displays a result of the search on the display unit 6 (Step ST8) FIG. 5 shows an example of a screen showing the search result. In a screen 50 of the search result shown in FIG. 5 is displayed a catalog of images 51 extracted as the search result and displayed in order of better agreement with the search image, a "Print" button 52 for changing to a screen for printing, a "Retry" button 53 for searching again, and a "Quit" button 54 for ending the search to change to an initial screen. In FIG. 5, a plurality of images are collectively referred to as the images 51.

The user selects and clicks a desired one of the buttons. If the user selects the "Print" button 52, a screen is displayed on the display unit 6 for letting the user select a printing target. When the user selects the image to print, the CPU 12 outputs a printing instruction and sends the image data of the printing target to the controller 10. The controller 10 carries out image processing thereon for image quality improvement, and the processed image data are sent to the printer 8. The printer 8 then outputs a photographic print.

If the user selects the "Retry" button 53, the search screen 40 is displayed on the display unit 6, and the user can search again. When the user selects the "Quit" button 54, the menu screen is shown on the display unit 6.

As has been described above, in this embodiment, the image search is carried out by using a part or all of the representative image or images. Therefore, the search can be carried out more easily and more accurately based on fragmentary memories remembered by the user. Furthermore, since the search conditions can include a position of a main subject or a background, the search can be carried out in consideration of composition according to the more detailed conditions.

In the above description and in FIG. 1, the mouse is used as the input unit 7. However, another pointing device such as a pen tablet, or a keyboard, or a touch panel can be used as the input unit 7, depending on a manner of input.

Figure 6:
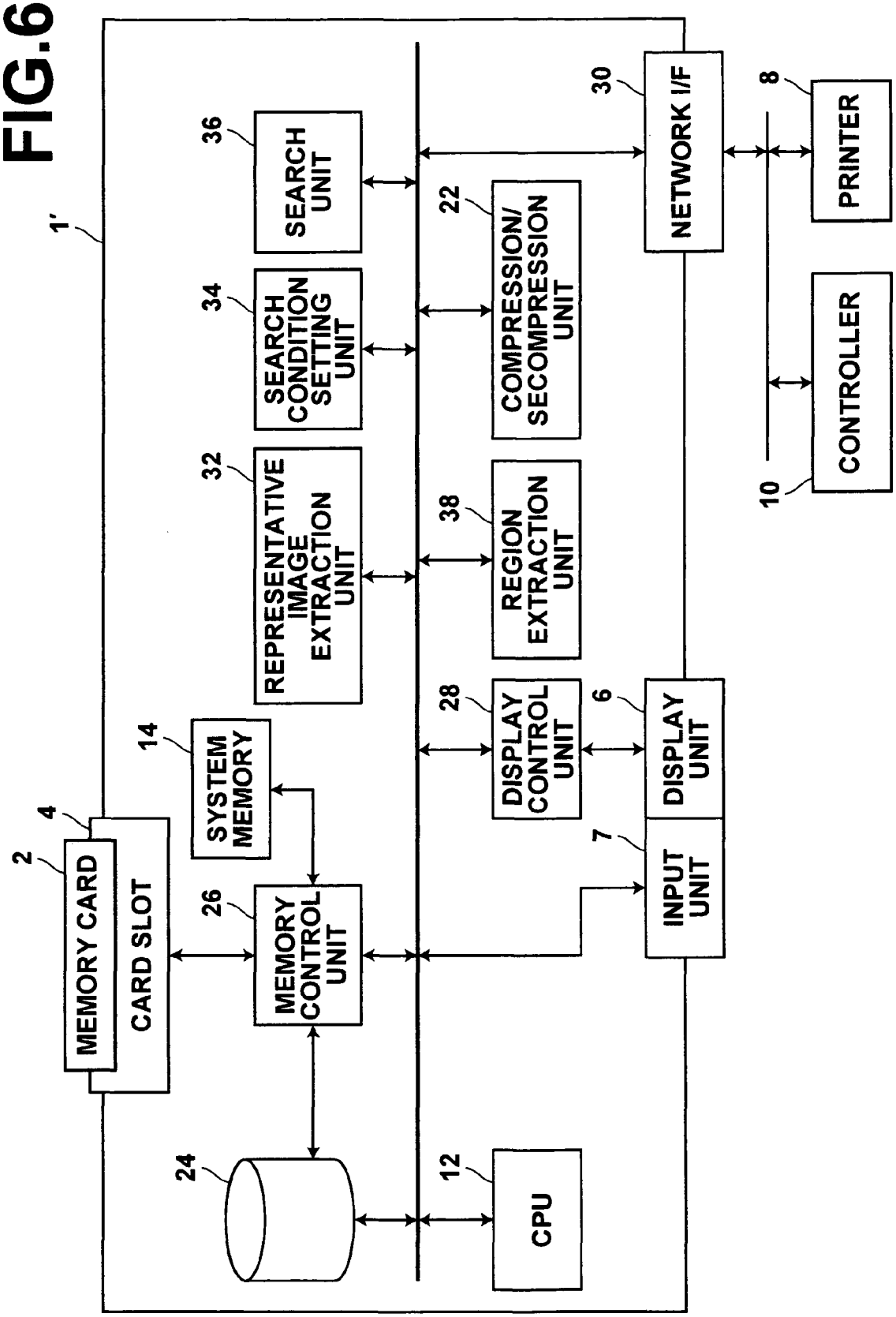
FIG. 6 is a block diagram showing the configuration of an image search apparatus of a second embodiment of the present invention.

A second embodiment of the present invention is described next. FIG. 6 is a block diagram showing the configuration of an image search apparatus 1' in the second embodiment. In the second embodiment, the same components as in the first embodiment have the same reference codes, and detailed description thereof is omitted. The image search apparatus 1' in the second embodiment comprises a region extraction unit 38 (region extraction means) added to the image search apparatus 1 in the first embodiment. Hereinafter, functions of the region extraction unit 38 are described together with procedures carried out in the second embodiment.

Figure 7:
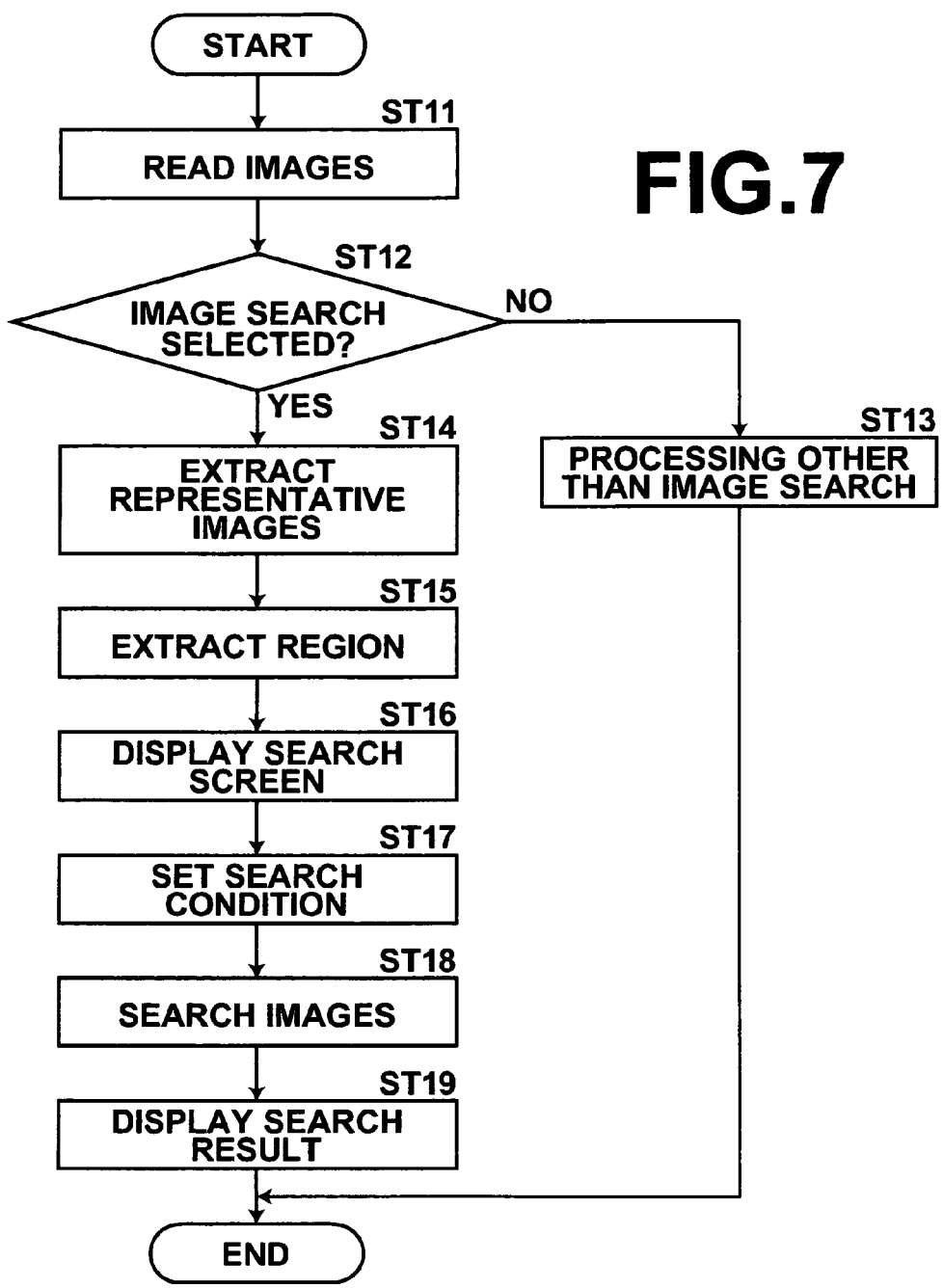
FIG. 7 is a flow chart showing procedures carried out in the second embodiment.

FIG. 7 is a flow chart showing the procedures of image search in the second embodiment. Processing flow from Step ST11 to ST14 is the same as the processing flow from Step ST1 to ST4 in the first embodiment. Therefore, description thereof is omitted.

Figure 8:
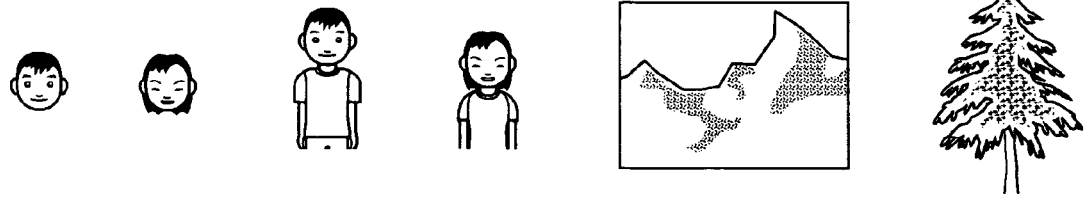
FIG. 8 shows examples of extracted regions.
Figure 9:
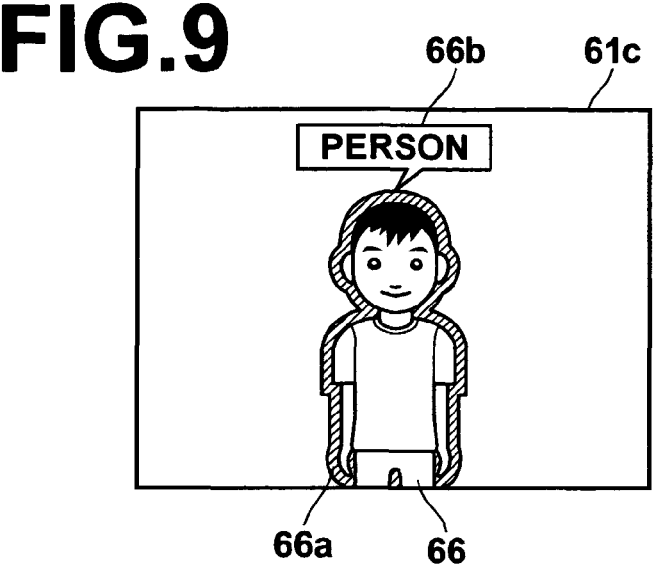
FIG. 9 shows an example of displaying an extracted region in a representative image after adding a bounding outline and the type thereto.

After a representative image or representative images has/have been extracted at Step ST14, the region extraction unit 38 extracts a main subject region and/or a background region from the representative image or images as a candidate or candidates for selection of a part or all of the representative image or images by a user (Step ST15), and stores the region or regions while causing the region or regions to become selectable. The region or regions can be extracted according to a known method such as edge detection. Causing the extracted region or regions to become selectable refers to displaying the extracted region or regions on the display unit 6 or displaying the extracted region or regions on the display unit 6 after adding a bounding outline, marking, and the type of region thereto, for example. The type of region refers to "person", "background", "object" (a region other than a person or scenery), or the like. FIG. 8 shows an example of a catalog of the extracted regions displayed on the display unit 6. FIG. 9 shows an example displayed in a representative image 61c wherein a person 66 has been extracted as the main subject region and added with a bounding outline 66a and a small window 66b representing the type of the region. By displaying the region or regions in this manner, confirmation thereof becomes easier.

Figure 10:
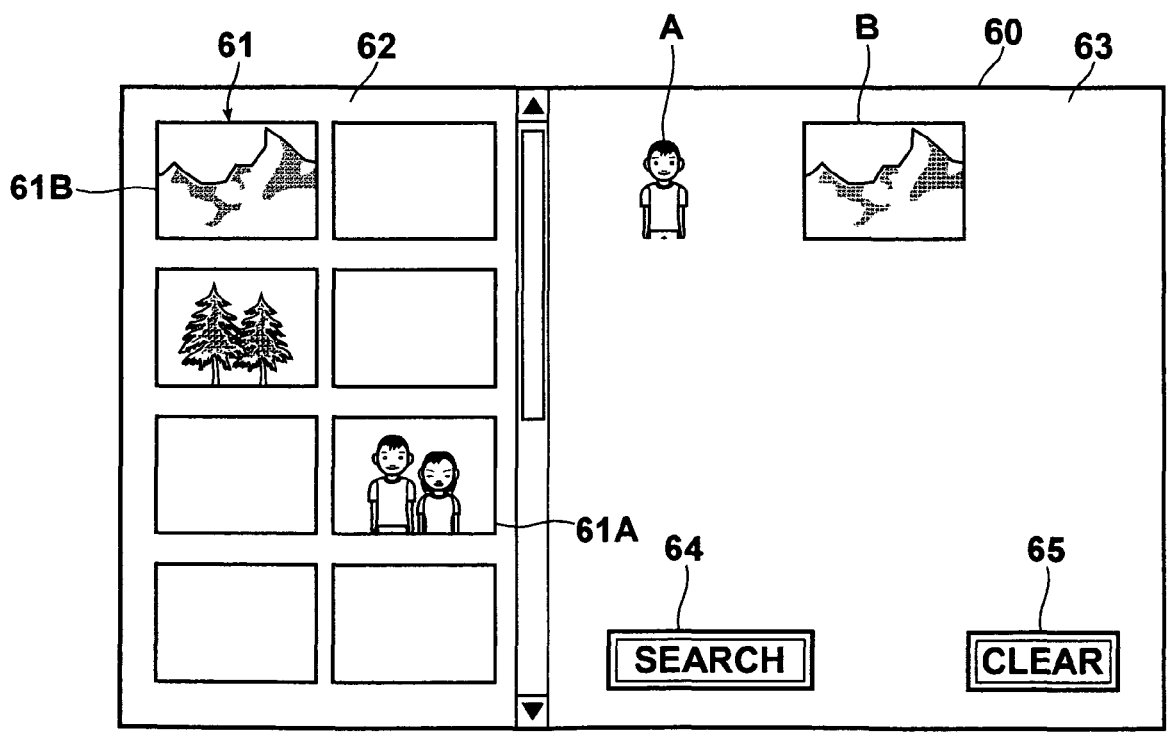
FIG. 10 shows an example of a search screen.

The display control unit 28 displays a search screen on the display unit 6 (Step ST16). FIG. 10 shows an example of the search screen. As shown in FIG. 10, a search screen 60 includes a representative image area 62 wherein a catalog of representative images 61 is shown, and an input area 63 for displaying a selected region. The input area 63 has a "Search" button 64 for carrying out a search and a "Clear" button 65 for clearing input data. In FIG. 10, the representative images are collectively shown by the reference code 61, and two of the images are referred to as images 61A and 61B.

The user selects the representative image including a search target from the catalog of the representative images 61, and selects as a region of the search target the main subject region or the background region extracted in advance. In response, the search condition setting unit 34 sets the selected region as the search conditions (Step ST17). In this embodiment, a part or all of the selected representative image also functions as a search image part. The region is selected in the following manner, for example.

When the user selects the representative image in the search screen 60, a sub-menu is displayed for letting the user select either a main subject (region) or a background (region) in the selected representative image to be used as the search conditions. In the case where the background has been selected, the background is displayed in the input area 63. In the case where the main subject has been selected and the representative image has a plurality of main subjects, a screen is displayed for letting the user further select one of the main subjects to be used as the search target. The selected main subject is then displayed in the input area 63. By repeating this selection procedure, the user can select a plurality of regions, and all the selected regions are displayed in the input area 63. In the input area 63 in FIG. 10, the person on the left of the representative image 61A has been selected as a main subject A and a background in the representative image 61B has been selected as a background B. Clicking the "Clear" button 65 can cancel the selected region in the input area 63 if the region is unnecessary.

After the user clicks the "Search" button 64, the search unit 36 carries out the search for an image or images agreeing with the search conditions (Step ST18). The search is carried out in the same manner as in the first embodiment. However, in the second embodiment, only matching of the main subject and the background is carried out. Therefore, a position thereof is not considered, which is different from the first embodiment.

After the search is complete, the display control unit 28 displays a search result on the display unit 6 (Step ST19). The processing flow thereafter is the same as the processing flow from Step ST8 in the first embodiment.

As has been described above, in the second embodiment, the region or regions in the representative image or images is/are selected in advance for letting the user carry out selection from the region or regions. Therefore, the user does not need to carry out the drag operation for region selection and the drag-and-drop operation for pasting as in the first embodiment. Consequently, the user can carry out the search after the simple operation. For this reason, the input unit 7 in the second embodiment does not necessarily comprise a mouse or a pen tablet, and a touch panel can be sufficient for the configuration.

The region extraction unit 38 may be applied to the first embodiment. In this case, a region or regions in a representative image in the first embodiment is/are extracted in advance so that a user can generate a search image for carrying out an image search by selection of the extracted region or regions.

A modification to the embodiments of the present invention is described next. The configuration of the modification is the same as the second embodiment. However, whenever a region as a search image part is set as the search conditions, an image search is carried out to display a result of the search, which is a difference from the second embodiment. In the description below, only the difference from the second embodiment is described, and description of the same components and the procedures as in the second embodiment is omitted.

Figure 11:
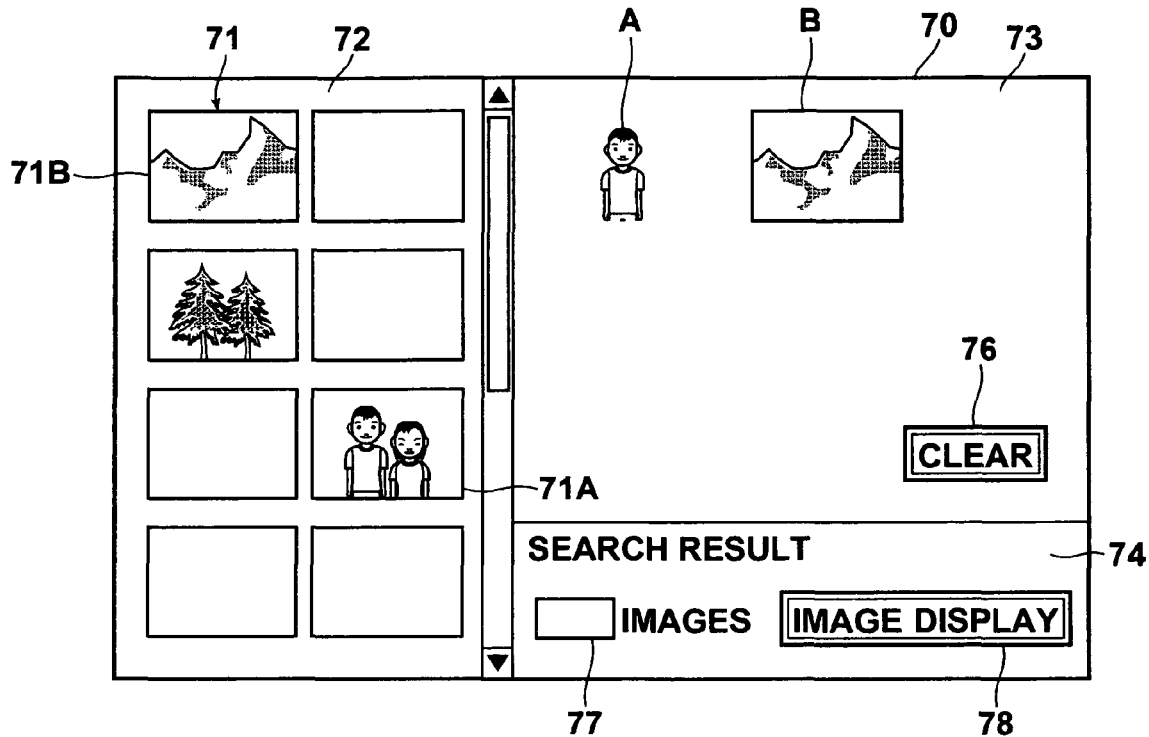
FIG. 11 shows an example of a search result screen.

FIG. 11 shows an example of a search screen in the modification. As shown in FIG. 11, a search screen 70 has a representative image area 72 for display of a catalog of representative images 71, an input area 73 for display of a selected region, and a search result area 74 for display of a search result. In the input area 73, a "Clear" button 76 for clearing input data is displayed. In the search result area 74 are displayed a quantity display area 77 for displaying the quantity of images found as the search result, and an "Image Display" button 78 for displaying the images found through the search.

When a user selects a main subject region or a background region as a search image part, the region is displayed in the input area 73. The search condition setting unit 34 automatically sets the selected region as the search conditions, and the search unit 36 automatically carries out the search. After the image search, the display control unit 28 automatically displays the quantity of the images extracted through the search in the quantity display area 77 in the search result area 74. When the user clicks the "Image Display" button 78 at this stage, a catalog of the extracted images is displayed on the display unit 6.

Procedures from selection of the region to the display of the quantity as the search result are carried out whenever a region is selected. For example, when the user selects the person on the left of the representative image 71A as a main subject A, images including the main subject A are searched for, and the quantity of the images is displayed in the quantity display area 77. When the user further selects a background of the representative image 71B as a background B, the images including the main subject A found through the previous search are searched for images including the background B. The quantity of the images is then displayed in the quantity display area 77.

As has been described above, according to this modification, the user can select a region as the search image part while viewing the search result displayed after each search. Therefore, efficient search refinement can be carried out.

In the example shown in FIG. 11, only the quantity is displayed as the result of the search. However, thumbnail images of the images found as the search result may be displayed with or without the quantity. In the above description, the modification has been described as the modification to the second embodiment. However, the search and the display of the search result may also be carried out in the first embodiment whenever a region as the search image part is selected. In addition, in the screen of the search result, the region or regions having been found through the search may be displayed in a state where a bounding outline or bounding outlines is/are added thereto, for example. In this manner, the region or regions having been found can be easily confirmed.

In the embodiments and in the modification described above, the search condition setting unit 34 may have other functions for setting the search conditions. Hereinafter, two examples in this case are described.

A first example is the case where the search condition setting unit 34 has a function for carrying out image processing on the part or all of the representative image or images having been selected as the search image part or parts. The search conditions are then set by using the part or all of the representative image or images having been subjected to the image processing. Various kinds of processing such as resizing, rotation, deformation, color change, blurring, color correction, red-eye correction, skin enhancement, and camera-shake correction can be listed as the image processing. For example, in the case where a user has clear memory of one thing but has unclear memory of another thing, the thing of which the memory is unclear is blurred. In this manner, the search conditions can be set to become more similar to the fragmentary memories of the user. In addition, clothes of a predetermined person, an object, or the like may be changed to have a color or texture that is more similar to the memory. In this case, the search conditions can also be set to become more similar to the fragmentary memories of the user.

The image processing may be carried out according to an instruction input by the user after selection of the search image part or parts. Alternatively, the image processing may be carried out before the selection. In addition, the user may decide to execute or not to execute the image processing.

By letting the search condition setting unit 34 have the image processing function, a state of the search image part or parts regarding the content of the image or images to be found can be more appropriately reflected in the search.

A second example is the case where the search condition setting unit 34 has a function for adding search priority as one of the search conditions to the part or all of the representative image or images having been selected as the search image part or parts. For example, the priority is added according to what is prioritized, such as persons among the search image parts, a specific person among a plurality of persons, an object (that is, a search image part other than people and scenery), a specific object among a plurality of objects, and scenery. Since the search priority is generally different for each of the search image parts, adding the priority can cause the search to reflect an intention of the search and a degree of clearness of memory. As a specific method therefor, each of the search image parts is weighted according to the priority, and set as one of the search conditions. The search is then carried out to reflect the priority in a result of the search.

Figure 12:
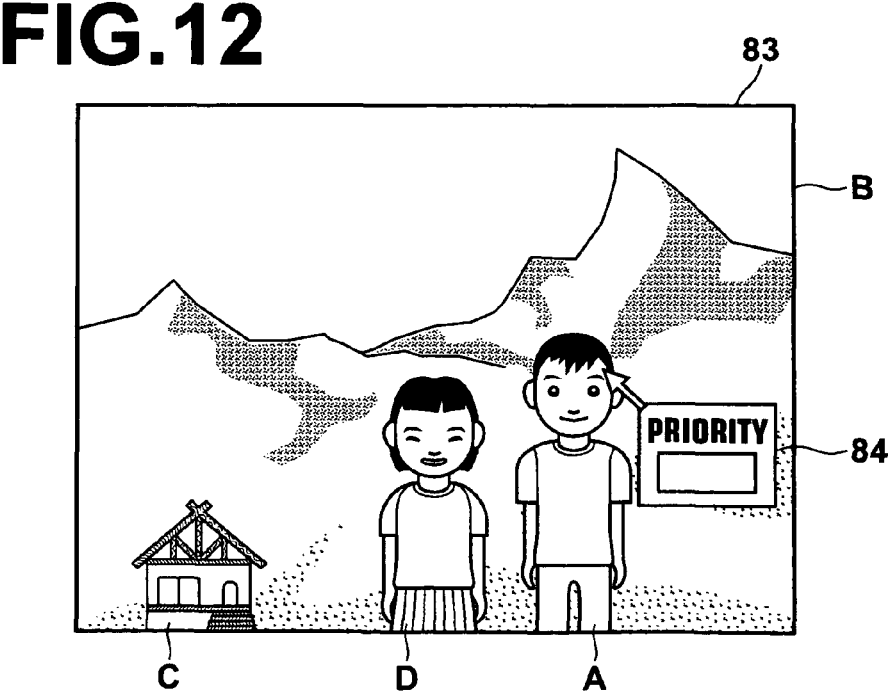
FIG. 12 shows an example of a search screen.

A plurality of methods can be used as a method of adding the priority. For example, the user may input the priority for each of the search image parts in the form of numbers. FIG. 12 shows an example of this case. In the example shown in FIG. 12, the person on the right, the scenery, the house, and the person on the left pasted in an input area 83 have been respectively set as search image parts A, B, C, and D. When the user clicks any one of the search image parts in the input area 83, a small window 84 for inputting the priority is displayed. The user then inputs a value representing the priority by use of input means such as a keyboard.

Figure 13:
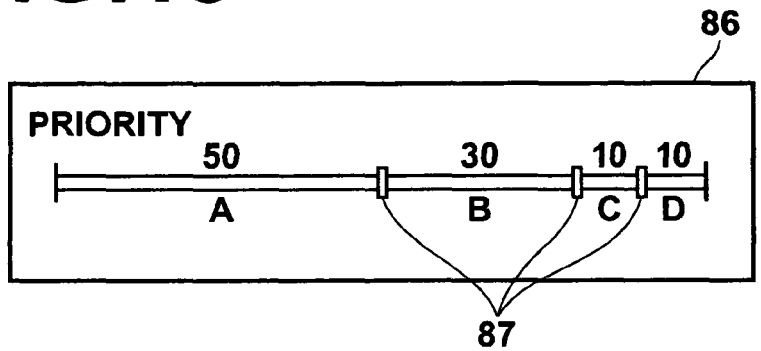
FIG. 13 shows an example of a priority setting window.

The priority may be added to become 100 when totaled up for all the search image parts. In this case, a priority setting window 86 shown by FIG. 13 as an example is displayed on the screen to be used for setting the priority. In the priority setting window 86 shown in FIG. 13, the alphabets A, B, C, and D respectively refer to the search image parts A, B, C, and D. The values "50", "30", "10", and "10" above the alphabets respectively represent the priority set to the search image parts A, B, C, and D. The user can change the values by sliding bars 87 along the horizontal direction of the screen. The values are set so as to total 100 in any cases. The priority may be set as a ratio such as 3:3:2:1. By adding the priority in the form of numbers, detailed setting can be realized.

Alternatively, the user may only specify the order of priority. In this case, the priority is set according to a ratio that is predetermined in the order of priority. It is preferable for the ratio to be changeable. In this manner, the priority can be set easily, since only the order of priority needs to be specified in the case where adding detailed numbers such as the ratio to the respective search image parts is difficult and troublesome. Consequently, a burden on the user can be reduced.

Alternatively, modes such as a mode for prioritizing a person and a mode for prioritizing scenery may be prepared so that the user can select any one of the modes that causes the priority to become higher for the search image part he/she wishes to prioritize. By using such modes, the priority can be set more easily.

In addition, the priority may be set according to a state of each of the search image parts. For example, the priority may be set higher for a larger part, a less blurry part, a more foreground part when positioned in the input area, and a part occupying a larger area in the corresponding representative image, for example. By using such setting, easiness of operation is improved and the priority can be set more easily according to sensation of the user.

The function for carrying out the image processing described as the first example may be used together with the function for adding the priority described as the second example. For example, when a predetermined search image part is subjected to blurring carried out by the image processing function and added with the priority, the priority may be set to become higher as a degree of blur becomes lower. Furthermore, in the case where a size of a predetermined search image part is enlarged by the image processing function and the priority is added thereto, the priority may be set higher as the size thereof becomes larger.

Figure 14:
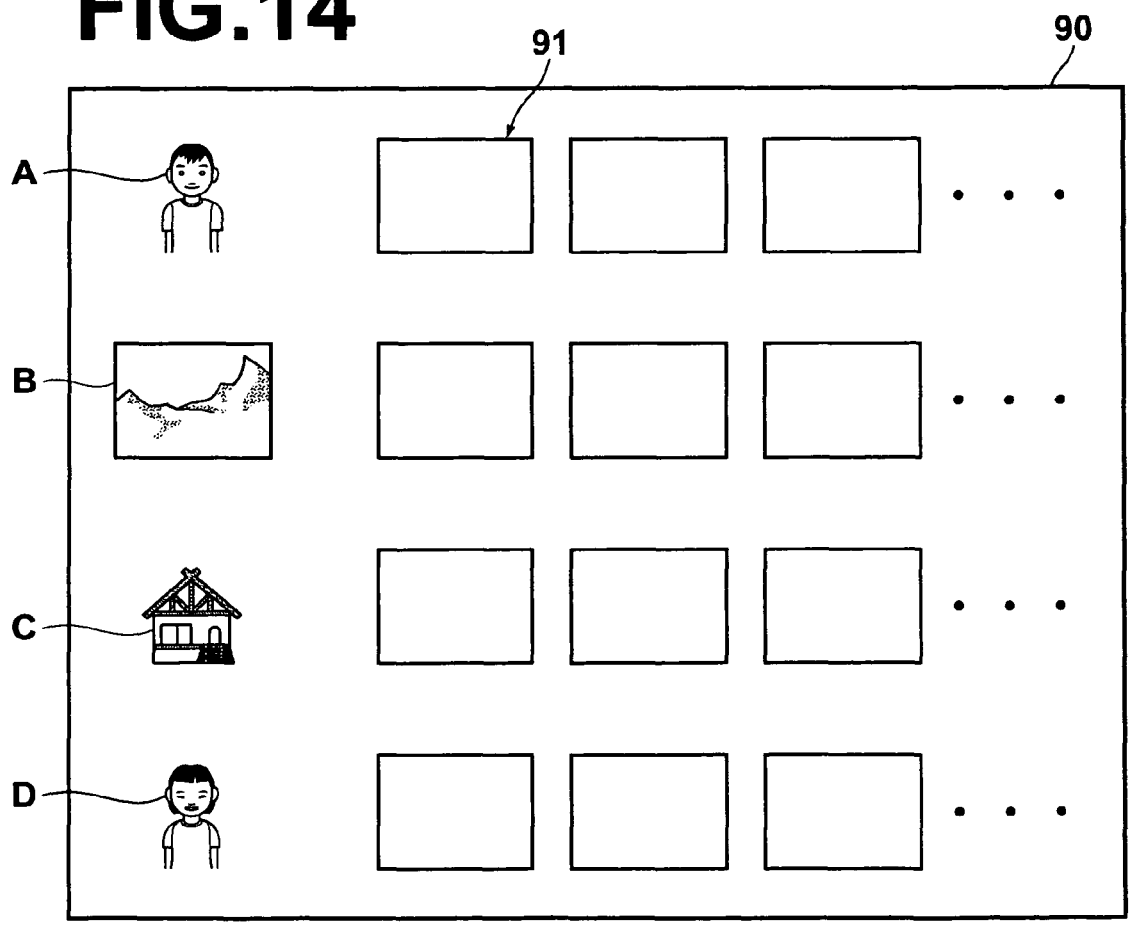
FIG. 14 shows an example of a search result screen.

Various modifications can be made to the present invention, in addition to the embodiments and the modifications described above. For example, the search result is displayed for all the search image parts in the order of better agreement in the embodiments described above. However, the search result may be displayed in order of better agreement for each of the search image parts. FIG. 14 shows an example in this case. In a screen 90 representing a search result in the example shown in FIG. 14, the search image parts A, B, C, and D are shown vertically in the left most column. Images 91 arranged in the order of better agreement are shown as the search result, in rows to the right of the respective search image parts.

In the above embodiments, the case has been described where an image obtained as the search result is printed. However, use of the search result is not necessarily limited to printing. The image data obtained through the search result may be sent to a desired location or written in a desired recording medium.

When the representative image or images is/are extracted, the respective images may be classified according to date based on information on photography time and date thereof so that an image that best represents the type of event or main subject can be extracted as the representative image according to the classification. In addition, an access log such as past searches and printing may be stored so that an image that has been frequently ranked high in the past searches or frequently printed can be extracted as the representative image.

The representative image from which the search image part has been extracted has a substantially high probability of being found in a search using the part. Therefore, the priority added thereto may be lowered or the image may be excluded at the time of the search.

Although the embodiments of the present invention and the modifications thereto have been described above, a program that causes a computer to function as means corresponding to the representative image extraction unit 32, the search condition setting unit 34, the search unit 36, and the region extraction unit 38 for carry out the procedures shown in FIG. 3 or 7 is also an embodiment of the present invention. A computer-readable recording medium storing the program is also an embodiment of the present invention.

What is claimed is:

1. An image search apparatus comprising:
   a display to display one or more representative images extracted from an image group comprising a plurality of images;
   a search condition setting module to set a search image generated by using a combination of a part or all of the one or more representative images selected therefrom as search conditions, the search condition setting module being capable of specifying a position of the selected part of the one or more representative image within the search image in a case where the part of the one or more representative images are used; and
   a search module to search the image group for an image agreeing with the search conditions,
   wherein the search condition setting module carries out image processing on the part or all of the representative image or images selected, sets the search conditions by using the part or all of the representative image or images having been subjected to the image processing, and further adds search priority depending on the degree of the image processing carried out as one of the search conditions to the part or all of the representative image or images selected.

2. The image search apparatus according to claim 1, further comprising region extraction module to extract a main subject region and/or a background region from the representative image or images as a candidate or candidates for selection of the part or all of the representative image or images and for causing the extracted region or regions to become selectable.

3. The image search apparatus according to claim 1 wherein the image processing includes image resizing, rotation, deformation, color change, blurring, color correction, red-eye correction, skin enhancement, and camera-shake reduction.

4. Image search apparatus according to claim 1, wherein the search condition setting module is capable of setting the size of the part or all of the representative image or images which is selected within the search image as a search condition setting.

5. Image search apparatus according to claim 1, wherein the search image is generated from a single region.

6. Image search apparatus according to claim 1, further comprises a representative image extracting module to automatically extract one or more representative images from the image group comprising the plurality of image.

7. Image search apparatus according to claim 1, wherein search results containing images found are displayed in order sorted by closeness of agreement with the set search condition for a part of all of the image selected from among the one representative image or the plurality of representative images.

8. An image search method implemented on a computer having a processor, memory, input unit and display, the image search method comprising:
   displaying one or more representative images extracted from an image group comprising a plurality of images;
   setting search conditions by using a combination of a part or all of the one or more representative images selected therefrom and by specifying a position of the selected part of the one or more representative image within the search image in a case where the part of the one or more representative images are used;
   searching the image group for an image agreeing with the set search conditions; and
   using the display to show the image found that met the set search conditions,
   wherein setting the search condition carries out image processing on the part or all of the representative image or images selected, sets the search conditions by using the part or all of the representative image or images having been subjected to the image processing, and further adds search priority depending on the degree of the image processing carried out as one of the search conditions to the part or all of the representative image or images selected.

9. A non-transitory computer readable medium with an executable program stored thereon, wherein the program instructs a computer to execute an image search method comprising the procedures of:
   displaying one or more representative images extracted from an image group comprising a plurality of images;
   setting search conditions by using a combination of a part or all of the one or more representative images selected therefrom and by specifying a position of the selected part of the one or more representative image within the search image in a case where the part of the one or more representative images are used; and
   searching the image group for an image agreeing with the set search conditions,
   wherein setting the search condition carries out image processing on the part or all of the representative image or images selected, sets the search conditions by using the part or all of the representative image or images having been subjected to the image processing, and further adds search priority depending on the degree of the image processing carried out as one of the search conditions to the part or all of the representative image or images selected.

* * * * *